United States Patent
Hawwa et al.

[11] Patent Number: 6,108,175
[45] Date of Patent: Aug. 22, 2000

[54] BIMORPH PIEZOELECTRIC MICROACTUATOR HEAD AND FLEXURE ASSEMBLY

[75] Inventors: Muhammad A. Hawwa, Simi Valley; Joseph M. Sampietro, Tarzana; Anoush M. Fard, Agoura Hills; Jeffrey G. Barina, Somis; Khosrow Mohajerani, Newbury Park, all of Calif.

[73] Assignee: Seagate Technology, Inc., Scotts Valley, Calif.

[21] Appl. No.: 08/836,265

[22] PCT Filed: May 1, 1997

[86] PCT No.: PCT/US97/07233

§ 371 Date: May 1, 1997

§ 102(e) Date: May 1, 1997

[87] PCT Pub. No.: WO98/27547

PCT Pub. Date: Jun. 25, 1998

Related U.S. Application Data

[60] Provisional application No. 60/033,367, Dec. 16, 1996.

[51] Int. Cl.[7] ............................. G11B 5/55; G11B 21/10
[52] U.S. Cl. ............................................ 360/294.4
[58] Field of Search ................................. 360/103, 104, 360/106, 109, 294.1–294.6

[56] References Cited

U.S. PATENT DOCUMENTS

| | | | |
|---|---|---|---|
| 3,678,482 | 7/1972 | Billawala | 340/174.1 |
| 3,924,268 | 12/1975 | McIntosh et al. | 360/78 |

(List continued on next page.)

FOREIGN PATENT DOCUMENTS

| | | |
|---|---|---|
| 63-122069 | 5/1988 | Japan . |
| 2-263369 | 4/1989 | Japan . |
| 3-069073 | 3/1991 | Japan . |
| 4-134681 | 5/1992 | Japan . |
| 4-368676 | 12/1992 | Japan . |
| 5-094682 | 4/1993 | Japan . |
| 6-020412 | 1/1994 | Japan . |
| 7-085621 | 3/1995 | Japan . |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS–Based HDD Slider" by Imamura et al, *IEEE* 1996.

"An Experiment for Head Positioning System Using Sub–micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp. 119–125.

(List continued on next page.)

*Primary Examiner*—Jefferson Evans
*Attorney, Agent, or Firm*—Kinney & Lange, P.A.

[57] ABSTRACT

A head flexure assembly for positioning a transducing head over a selected track of a rotatable disc in a disc drive system having an actuator arm and head suspension includes a bimorph piezoelectric microactuator having first and second ends. The first end of the microactuator is attached to the actuator arm, and a flexure is attached to the second end of the microactuator. A slider carrying the transducing head is attached to the flexure.

9 Claims, 4 Drawing Sheets

6,108,175
Page 2

U.S. PATENT DOCUMENTS

| | | | |
|---|---|---|---|
| 4,374,402 | 2/1983 | Blessom et al. | 360/104 |
| 4,605,977 | 8/1986 | Matthews | 360/103 |
| 4,620,251 | 10/1986 | Gitzendanner | 360/103 |
| 4,651,242 | 3/1987 | Hirano et al. | 360/103 |
| 4,853,810 | 8/1989 | Pohl et al. | 360/103 |
| 4,914,725 | 4/1990 | Belser et al. | 318/560 |
| 5,021,906 | 6/1991 | Chang et al. | 360/103 |
| 5,034,828 | 7/1991 | Ananth et al. | 360/75 |
| 5,065,268 | 11/1991 | Hagen | 360/104 |
| 5,079,659 | 1/1992 | Hagen | 360/104 |
| 5,105,408 | 4/1992 | Lee et al. | 369/44.15 |
| 5,177,652 | 1/1993 | Yamaguchi et al. | 360/78.05 |
| 5,189,578 | 2/1993 | Mori et al. | 360/106 |
| 5,255,016 | 10/1993 | Usui et al. | 346/140 |
| 5,276,573 | 1/1994 | Harada et al. | 360/103 |
| 5,552,809 | 9/1996 | Hosono et al. | 347/10 |
| 5,623,461 | 4/1997 | Sohmuta | 369/32 |
| 5,657,188 | 8/1997 | Jurgenson et al. | 360/106 |
| 5,745,319 | 4/1998 | Takekado et al. | 360/78.05 |
| 5,764,444 | 6/1998 | Imamura et al. | 360/109 |
| 5,781,381 | 7/1998 | Koganezawa et al. | 360/106 |
| 5,793,571 | 8/1998 | Jurgenson et al. | 360/104 |
| 5,796,558 | 8/1998 | Hanrahan et al. | 360/106 |
| 5,805,382 | 9/1998 | Lee et al. | 360/104 |
| 5,896,246 | 4/1999 | Budde et al. | 360/104 |
| 5,898,541 | 4/1999 | Boutaghou et al. | 360/109 |
| 5,936,805 | 8/1999 | Imaino | 360/104 |
| 5,982,585 | 11/1999 | Fan et al. | 360/104 |

OTHER PUBLICATIONS

"A Dual–Stage Magnetic Disk Drive Actuator Using a Piezoelectric Device for a High Track Density" by Mori et al., *IEEE Transactions on Magnetics*, vol. 37, No. 6, Nov. 1991.

"Dynamic Loading Criteria for 3½ Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, N.

ABIMORPH PIEZOELECTRIC MICROACTUATOR HEAD AND FLEXURE ASSEMBLY

CROSS-REFERENCE TO RELATED APPLICATION

This application claims priority from Provisional Application No. 60/033,367, filed Dec. 16, 1996 for "Bimorph Piezoelectric Actuator Head and Flexure Assembly" by Muhammad A. Hawwa, Joseph M. Sampietro, Anoush M. Fard, Jeffrey G. Barina and Khosrow Mohajerani.

BACKGROUND OF THE INVENTION

The present invention relates to a microactuator for a disc drive system, and more particularly to a bimorph piezoelectric microactuator motor integrated into a head and flexure assembly.

The recording density of radial data tracks required in high performance disc drives continues to increase, necessitating higher resolution in head micropositioning devices to accommodate the decreased track pitch. Conventional actuators, utilizing a voice coil motor (VCM) for example, lack the precision to achieve the resolution required. Hence, an additional microactuator capable of adjusting the position of the head across several radial tracks with high precision must be implemented in the disc drive.

A number of solutions have been proposed to effect fine movement of the transducing head. The microactuator proposals have taken several forms, including a micro-motor attached directly to the slider and a piezoelectric microactuator implemented at the head mounting block connecting the head suspension to the actuator arm. However, no universally acceptable microactuator design has been found that combines manufacturing simplicity with superior performance characteristics, including a high movement-to-applied-voltage ratio, sufficient force for a given movement, and sufficient frequency response of the microactuator.

Thus, there is a need in the art for a microactuator design that is simple to manufacture and provides superior performance characteristics.

SUMMARY OF THE INVENTION

The present invention is a head flexure assembly for positioning a transducing head over a selected track of a rotatable disc in a disc drive system having an actuator arm and head suspension. The head flexure assembly includes a bimorph piezoelectric microactuator having first and second ends. The first end of the microactuator is attached to the head suspension, and a flexure is attached to the second end of the microactuator. A slider carrying the transducing head is attached to the flexure.

In one embodiment, the first end of the microactuator is clamped by swaged flaps of a swage plate, which is itself attached to the head suspension. In one form of this embodiment, the flexure includes swaged flaps connected to the second end of the microactuator.

According to another aspect of the invention, the bimorph piezoelectric microactuator includes first and second piezoelectric layers and a metal shim attached between the piezoelectric layers. A first conductive layer covers the first piezoelectric layer, and a first insulating coating covers the first conductive layer. A second conductive layer covers the second piezoelectric layer, and a second insulating coating covers the second conductive layer.

DETAILED DESCRIPTION OF THE PREFERRED EMBODIMENTS

Figure 1:
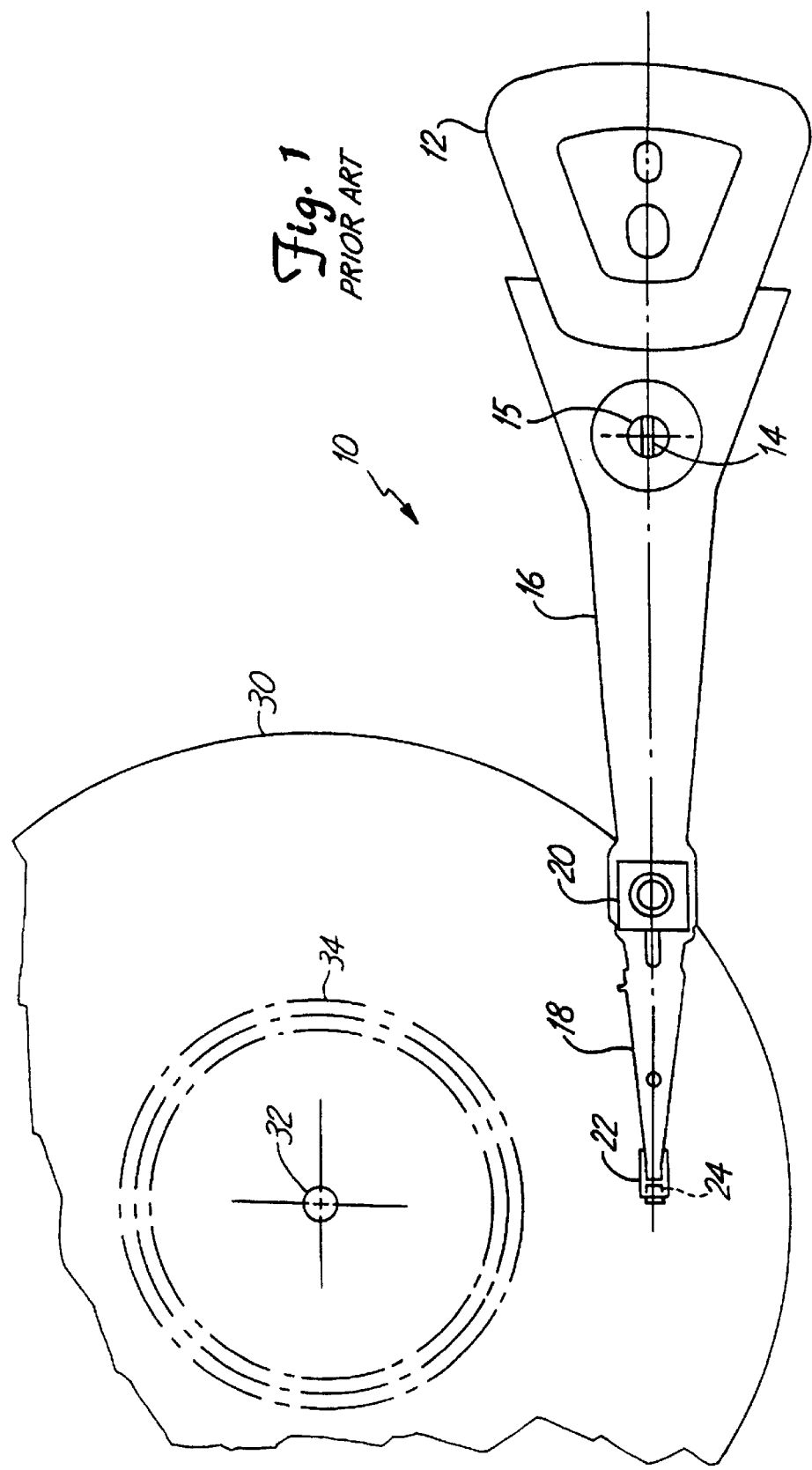
FIG. 1 is a top view of a disc drive actuation system for positioning a slider over tracks of a disc.

FIG. 1 is a top view of a disc drive actuation system 10 for positioning slider 24 over a track 34 of disc 30. Actuation system 10 includes voice coil motor (VCM) 12 arranged to rotate actuator arm 16 around axis 14. Head suspension 18 is connected to actuator arm 16 at head mounting block 20. Flexure 22 is connected to an end of head suspension 18, to fly slider 24 a small distance above the surface of disc 30. Slider 24 carries a transducing head (not shown in FIG. 1) for reading and/or writing data on tracks 34 of disc 30. Disc 30 rotates around axis 32, so that windage is encountered by slider 24 to keep it aloft over the surface of disc 30.

VCM 12 is selectively operated to move actuator arm 16 around axis 14, thereby moving slider 24 between tracks 34 of disc 30. However, for disc drive systems with high track density, VCM 12 lacks sufficient resolution to position the transducing head on slider 24 over a selected track 34 of disc 30. Therefore, a high resolution microactuator is also necessary.

Figure 2:
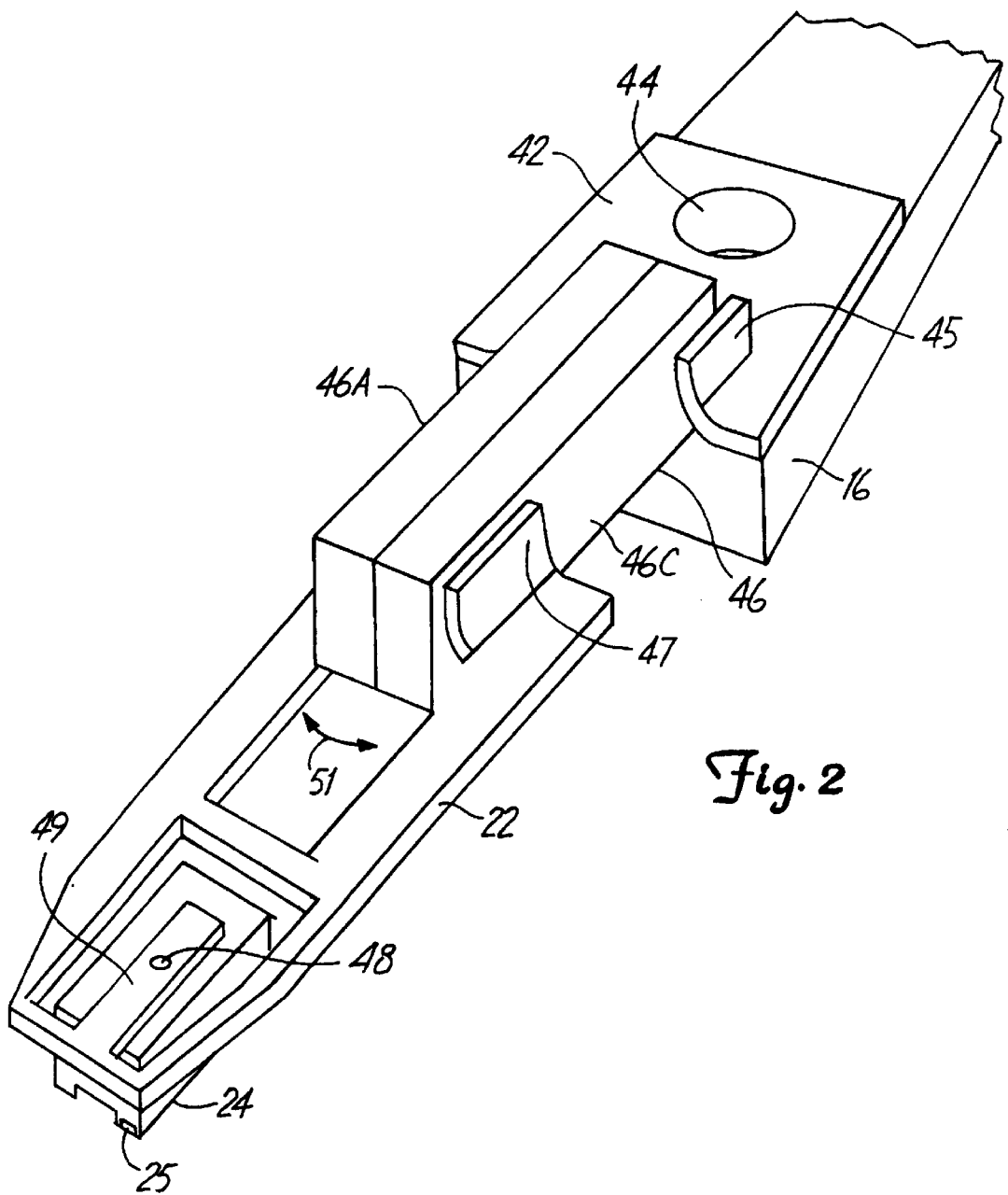
FIG. 2 is a perspective view of a head and flexure assembly with a swaged bimorph piezoelectric microactuator according to the present invention.

FIG. 2 is a perspective view of slider 24 and flexure 22 of the present invention. Swage plate 42 includes aperture 44 for attaching to a distal end of actuator arm 16 (FIG. 1). Bimorph piezoelectric microactuator 46 comprising piezoelectric layers 46a and 46c is clamped at one end by swaged flaps 45 of plate 42, and is attached to flexure 22 by swaged flaps 47 at its other end. Swaging is shown as an exemplary means for attaching microactuator 46; it will be apparent to one skilled in the art that other means of attachment may be employed. Plate 42 is connected to a actuator arm through aperture 44, or by a similar connection mechanism. Slider 24 is attached to flexure 22 in a manner known in the art. In the exemplary embodiment shown in FIG. 2, the trailing edge of slider 24 is attached to tongue portion 49 at gimbal point 48. Slider 24 includes transducing head 25 at its distal end. The process of assembling swage plate 42, microactuator 46, flexure 22 and slider 24 may be automated to improve manufacturing efficiency.

In operation, a voltage is applied to piezoelectric layers 46a and 46c of bimorph piezoelectric microactuator 46, causing one of the piezoelectric layers to expand and the other to contract along the length between plate 42 and flexure 22, thereby causing microactuator 46 to bend in the direction of arrows 51. The bending of microactuator 46 occurs in the direction of arrows 51 because it is restrained where it is connected to swage plate 42. Movement of microactuator 46 results in corresponding movement of flexure 22 and slider 24, thereby selectively changing the position of head 25 with respect to the tracks of a disc, when the slider and flexure assembly is implemented in a disc drive system in the manner generally shown in FIG. 1.

Figure 3:
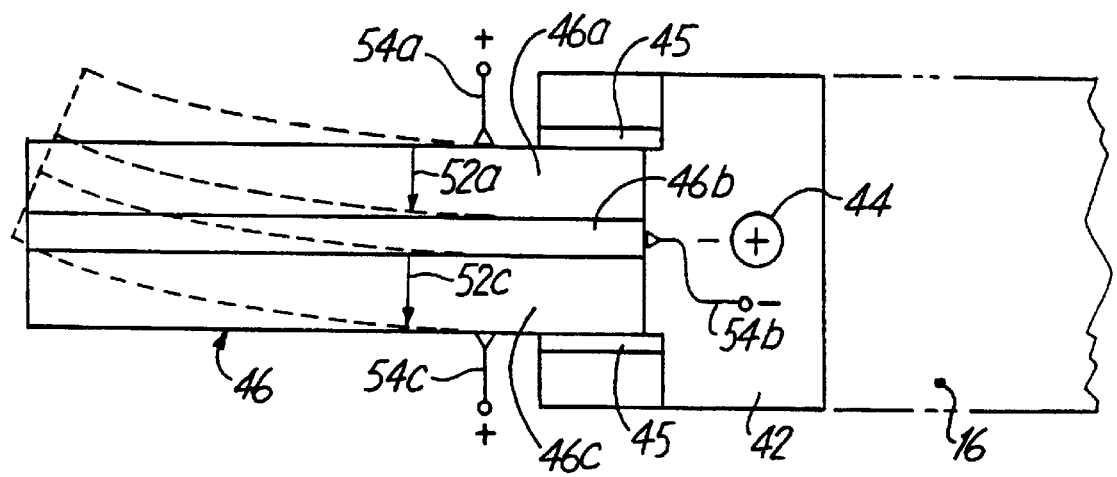
FIG. 3 is a top view of the bimorph piezoelectric microactuator shown in FIG. 2.

FIG. 3 is an enlarged view of piezoelectric microactuator 46 restrained at one end by swaged flaps 45 of plate 42.

Microactuator 46 includes first piezoelectric layer 46a, second piezoelectric layer 46c, and center metal shim 46b bonded between the piezoelectric layers by conductive adhesive. In the "parallel" configuration depicted in FIG. 3, piezoelectric layers 46a and 46c are poled in the direction of arrows 52a and 52c. A first voltage is applied at terminal 54a to piezoelectric layer 46a, and at terminal 54c to piezoelectric layer 46c. A second voltage is applied at terminal 54b to metal shim 46b. Thus, in the "parallel" configuration, piezoelectric layer 46a will contract, and piezoelectric layer 46c will expand, in response to the first and second voltages applied at the terminal. The result is a bending motion (shown in phantom) of piezoelectric microactuator 46, since swage plate 42 restrains one end of microactuator 46. The amount of bending of microactuator 46, and thus the amount of displacement of slider 24 (FIG. 2) connected to microactuator 46 by flexure 22, is precisely controlled by the voltages applied to terminals 54a, 54b and 54c. Thus, microactuator 46 is able to provide high resolution positioning of slider 24 over a selected track of a disc.

Figure 4:
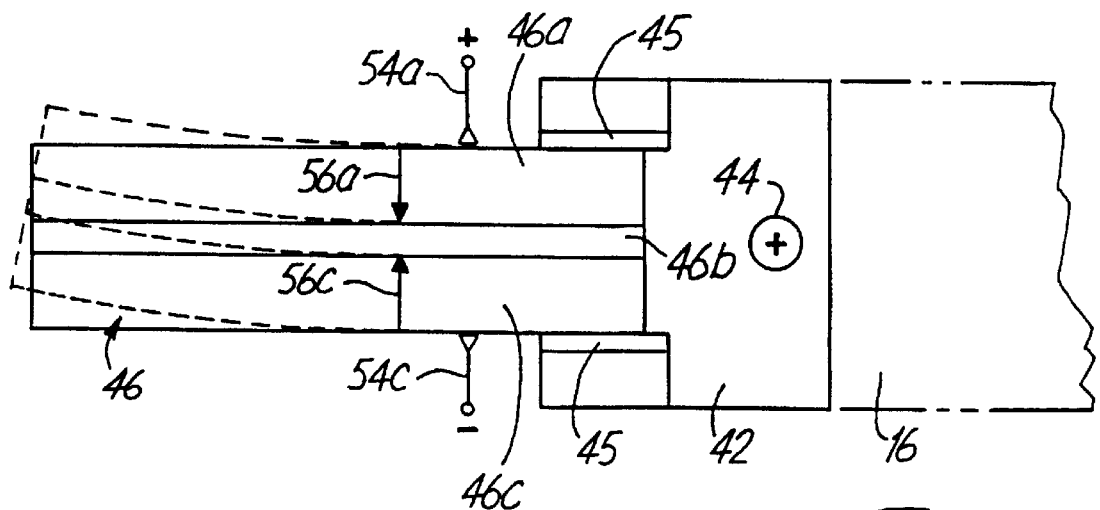
FIG. 4 is a top view of an alternative embodiment of the piezoelectric microactuator shown in FIG. 2.

In the alternative embodiment depicted by FIG. 4, piezoelectric microactuator 46 is constructed in a "series" configuration. Piezoelectric layer 46a is poled in the direction of arrow 56a and piezoelectric layer 46c is poled in the opposite direction, shown by arrow 56c. A first voltage is applied at terminal 54a to piezoelectric layer 46a, and a second voltage is applied at terminal 54c to piezoelectric layer 46c. As a result, piezoelectric microactuator 46 bends as indicated in phantom, since one end of microactuator 46 is restrained by swage plate 42. The "series" configuration is the simplest and most economical, since it requires only two connections to the outside surfaces of piezoelectric layers 46a and 46c. However, the "series" configuration yields less deflection per volt of applied potential than the "parallel" configuration shown in FIG. 3. The "parallel" configuration is more complex, requiring three electrical connections, the additional connection being made to the center shim. Either of the configurations shown in FIGS. 3 and 4 are acceptable for effecting high resolution positioning of slider 24 over a selected track of a disc.

Figure 5:
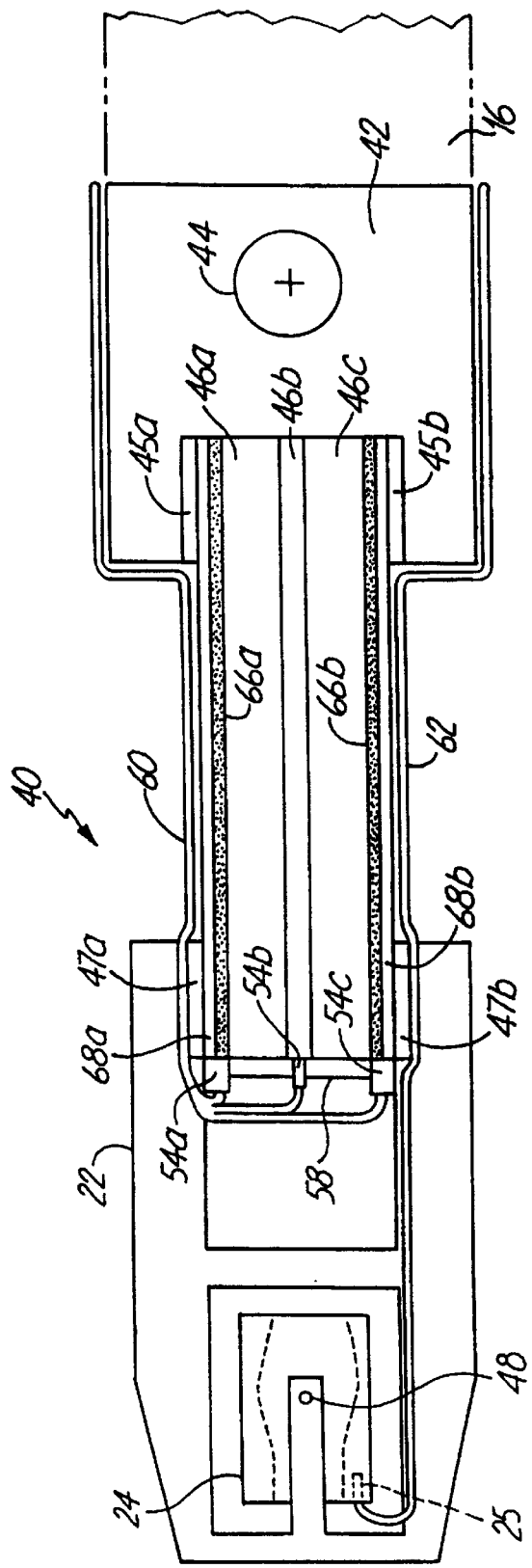
FIG. 5 is a top view of the head and flexure assembly having the swaged bimorph piezoelectric microactuator shown in FIG. 2, further showing an exemplary configuration of flexible wires for connection to the transducing head and the piezoelectric microactuator.

FIG. 5 is a top view of head and flexure assembly 40 of the present invention as shown generally in FIG. 2, further depicting an exemplary configuration of flexible wires 60 and 62 for connection to the piezoelectric microactuator layers 46a–46c and transducing head 25, respectively. Wiring 62 for connection to transducing head 25 is preferably routed along a side of head and flexure assembly 40, conforming to swaged flap 47b, piezoelectric layer 46c, and the periphery of swage plate 42, for connection to control circuitry located elsewhere in the disc drive system. Wiring 60 for connection to terminals 54a, 54b and 54c generally conforms to swaged flap 47a, piezoelectric layer 46a, and the outer periphery of swage plate 42, for connection to control circuitry located elsewhere in the disc drive system. Terminals 54a, 54b and 54c are preferably formed in insulating layer 58 covering a distal end of microactuator layers 46a, 46b and 46c.

The configuration of wiring shown in FIG. 5 is exemplary only; it will be apparent to one skilled in the art that other wiring configurations may be employed. For example, the control circuitry for the piezoelectric microactuator may be disposed directly on flexure 22, microactuator layers 46a–46c, swage plate 42, or insulating layer 58, with appropriate wiring to the microactuator layers 46a–46c. Swage plate 42 may itself be grounded and coupled to either metal shim 46b or to electrodes 66a and 66b. Any configuration where wires 60 and 62 do not interfere with the movement and positioning of bimorph piezoelectric microactuator 46a–46c and slider 24 carrying transducing head 25 is acceptable.

Conductive electrodes 66a and 66b are provided adjacent to piezoelectric layers 46a and 46c, respectively. The conductive electrodes 66a and 66b are further protected by insulating layers 68a and 68b, respectively. Layers 68a and 68b preferably include an additional epoxy coating, and the mechanical connection between insulating layer 68a and swaged flaps 45a and 47a, as well as the mechanical connections between insulating layers 68b and swaged flaps 45b and 47b are made by an epoxy bond. Electrodes 66a and 66b are therefore electrically isolated from a voltage associated with swage plate 42 and flexure 22. If a terminal configuration is desired such that the voltage on swage plate 42 is to be applied to electrodes 66a and 66b, a conductive via or wire may be provided to electrically connect electrodes 66a and 66b to swaged flaps 45a and 45b, respectively. It will be apparent to one skilled in the art that a variety of terminal and connection configurations are possible to implement the present invention.

The bimorph piezoelectric microactuator of the present invention enables a relatively large, high resolution displacement of a slider in a disc drive system in response to a relatively small force induced in the microactuator. For example, for a microactuator having a length of 0.3 inches, the displacement at the tip of the microactuator is 41.5 microinches at 10V DC (resulting in an even greater displacement at the transducing head due to the additional length of the flexure) with a force of only approximately 5 milliNewtons. A frequency of greater than 5 kiloHertz is possible for such a microactuator configuration. The length of the bimorph piezoelectric microactuator may be varied, depending on the desired relationship between head displacement, voltage, force, and frequency of the microactuator. The present invention provides excellent performance characteristics in a design that is simple to manufacture.

Although the present invention has been described with reference to preferred embodiments, workers skilled in the art will recognize that changes may be made in form and detail without departing from the spirit and scope of the invention.

What is claimed is:

1. A head flexure assembly for radially positioning a transducing head over a selected track of a rotatable disc in a disc drive system having an actuator arm and head suspension, the head flexure assembly comprising:

a bimorph piezoelectric microactuator having first and second ends, the microactuator being bendable in response to a control signal in a plane generally parallel to the rotatable disc;

attachment means attaching the first end of the microactuator to the actuator arm;

a flexure attached to the second end of the bimorph piezoelectric microactuator; and a slider attached to the flexure, the slider carrying the transducing head.

2. The head flexure assembly of claim 1, wherein the attachment means includes a swage plate having flaps swaged to clamp the first end of the bimorph piezoelectric microactuator.

3. The head flexure assembly of claim 1, wherein the flexure includes swaged flaps connected to the second end of the bimorph piezoelectric microactuator.

4. The head flexure assembly of claim 1, wherein the bimorph piezoelectric microactuator comprises:

a first piezoelectric layer poled in a first direction and having a first terminal to receive a first electrical potential;

a second piezoelectric layer poled in the first direction and having a second terminal to receive the first electrical potential; and a metal shim attached between the first and second piezoelectric layers and having a third terminal for receiving a second electrical potential.

5. The head flexure assembly of claim 4, wherein the bimorph piezoelectric microactuator further comprises:

a first conductive layer covering the first piezoelectric layer and electrically connected to the first terminal;

a first insulating coating covering the first conductive layer;

a second conductive layer covering the second piezoelectric layer and electrically connected to the second terminal; and a second insulating coating covering the second conductive layer.

6. The head flexure assembly of claim 5, wherein the first and second insulating coatings are epoxy bonded to the attachment means.

7. The head flexure assembly of claim 1, wherein the bimorph piezoelectric microactuator comprises:

a first piezoelectric layer poled in a first direction and having a first terminal to receive a first electrical potential;

a second piezoelectric layer poled in a second direction opposite the first direction and having a second terminal to receive a second electrical potential; and a metal shim attached between the first and second piezoelectric layers.

8. The head flexure assembly of claim 7, wherein the bimorph piezoelectric microactuator further comprises:

a first conductive layer covering the first piezoelectric layer and electrically connected to the first terminal;

a first insulating coating covering the first conductive layer;

a second conductive layer covering the second piezoelectric layer and electrically connected to the second terminal; and a second insulating coating covering the second conductive layer.

9. The head flexure assembly of claim 8, wherein the first and second insulating coatings are epoxy bonded to the attachment means.

\* \* \* \* \*